US008319367B2

(12) United States Patent  
Liao et al.

(10) Patent No.: US 8,319,367 B2
(45) Date of Patent: Nov. 27, 2012

(54) FLUID WHIRL LIGHTING APPARATUS

(75) Inventors: Jung-Huang Liao, Hsinchu County (TW); I-Te Huang, Hsinchu (TW); Jing-Lyang Jeng, Hsinchu County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 346 days.

(21) Appl. No.: 12/758,468

(22) Filed: Apr. 12, 2010

(65) Prior Publication Data

US 2011/0012355 A1 Jan. 20, 2011

(30) Foreign Application Priority Data

Jul. 14, 2009 (TW) ................................ 98123738 A

(51) Int. Cl.
*F03B 13/00* (2006.01)
(52) U.S. Cl. ............................. 290/54; 290/43; 290/1 R
(58) Field of Classification Search .................. 290/1 R, 290/43, 54
See application file for complete search history.

(56) References Cited

U.S. PATENT DOCUMENTS

| 4,114,046 A * | 9/1978 | Yousef ............................. 290/55 |
| 4,427,544 A * | 1/1984 | Roch ............................. 210/222 |
| 4,616,298 A | 10/1986 | Bolson |
| 6,150,943 A * | 11/2000 | Lehman et al. ............... 340/628 |
| 6,864,591 B2 | 3/2005 | DeFrank |
| 7,726,832 B2 | 6/2010 | Clark |
| 7,956,480 B2 * | 6/2011 | Onodera et al. ................ 290/54 |
| 2003/0147238 A1 | 8/2003 | Allen et al. |
| 2003/0168523 A1 | 9/2003 | Lin |
| 2004/0232701 A1 | 11/2004 | DeFrank |
| 2006/0113802 A1 * | 6/2006 | Ganev et al. ..................... 290/52 |
| 2010/0308587 A1 * | 12/2010 | Tu et al. .......................... 290/52 |

FOREIGN PATENT DOCUMENTS

| CN | 1931443 A | 3/2007 |
| CN | 201248646 Y | 6/2009 |
| JP | 2006189014 A | 7/2006 |
| TW | 269850 B | 1/2007 |
| TW | M344357 U | 11/2008 |
| TW | 200846549 A | 12/2008 |
| TW | M357462 U | 5/2009 |
| WO | 2007036943 A2 | 4/2007 |
| WO | 2007132973 A1 | 11/2007 |

OTHER PUBLICATIONS

European Patent Office Search Report, Nov. 15, 2010. Germany.

* cited by examiner

*Primary Examiner* — Tulsidas C Patel
*Assistant Examiner* — Viet Nguyen
(74) *Attorney, Agent, or Firm* — Morris Manning & Martin LLP; Tim Tingkang Xia, Esq.

(57) ABSTRACT

This disclosure provides a fluid whirl lighting apparatus, which comprises: a housing; a coil module, disposed on an inner wall of the housing; a rotor, disposed in the housing, provided with a plurality of blades on an inner wall thereof and a magnetic module on an outer wall corresponding to the coil module; a lighting module, disposed on the outer wall of the housing while electrically coupled to the coil module; and an alarm element, electrically connected to the coil module for issuing an alarm; wherein the outer wall of the rotor and the inner wall of the housing define an air-tight space for accommodating a liquid, and the rotor is rotated by a flowing fluid propelling the plural blades for enabling a relative movement between the coil module and the magnetic module for generating electricity; and the lighting module is used for providing illumination in response to the electricity.

20 Claims, 9 Drawing Sheets

FLUID WHIRL LIGHTING APPARATUS

CROSS-REFERENCE TO RELATED PATENT APPLICATION

This application claims priority to and the benefit of Taiwan Patent Applications No. 098123738, filed Jul. 14, 2009, the contents of which are incorporated herein in their entireties by reference.

TECHNICAL FIELD

This disclosure generally relates to a lighting apparatus and, more particularly, to a fluid whirl lighting apparatus using liquid to drive the power generating units to rotate and thus provide illumination.

TECHNICAL BACKGROUND

Since fire accidents usually take place to cause power failure in a building in the nighttime, it is difficult for stranded victims to escape from the scene in the dark, resulting in casualties.

According to the currently effective fire regulations for buildings, illumination equipments and guiding lamps for illumination during power failure are required be installed only in the evacuation routes such as exits or stairwells, as shown in FIG. 1. Nevertheless, such fire regulations are insufficient because the heavy smoke may block the lines of sight of the victims. Moreover, these illumination equipments and guiding lamps may be damaged by the fire to hinder the victims from fleeing for their lives.

On the other hand, since the illumination equipments and guiding lamps disposed at specific positions at the exits or in the evacuation route are powered by batteries, these illumination equipments and guiding lamps may be malfunctional due to failure or electricity insufficiency of batteries if the batteries are not regularly checked or replaced.

In view of the above, Taiwan Patent No. I269850 discloses a technology using a fluid to drive power generating devices to rotate and thus generate electricity to power up illumination equipments. Accordingly, such power generating devices can be disposed on firefighting water nozzles so that the power generating devices can be driven by water from the water nozzles to rotate and thus generate electricity to power up illumination equipments disposed on the firefighting water nozzles when fire accidents occur. Therefore, the victims can escape from the scene of fire under the guidance of light from the illumination equipments powered up by the water nozzles arranged as an array disposed on the ceiling. Moreover, U.S. Pat. No. 4,616,298 discloses a sprinkler system having a water-powered generator with axial and radial blades rotating to provide electricity for illumination elements. However, most components disposed in the sprinkler system easily rust because the sprinkler system has a water nozzle having a high-pressure hydraulic source so that the components disposed therein are immersed in water. Moreover, verdigris appears on the windings of the generator to adversely affect power generating efficiency and the operation of the water sprinkling element to provide illumination.

SUMMARY OF THIS DISCLOSURE

This disclosure provides a fluid whirl lighting apparatus, wherein a fluid flows through a rotor to drive blades therein so that the rotor rotates to generate a centrifugal force and cause lubricant accumulation. Therefore, the rotor generates electricity stably under high-speed rotation without the support from a rigid shaft.

This disclosure provides a fluid whirl lighting apparatus, wherein a gas-tight space is formed between the rotor outer wall and the housing due to a high hydraulic pressure when the apparatus is turned off. In this case, http://tw.rd.yahoo-.com/referurl/dictionary/mini/srp/evt=52049/*http://tw-.mini.yahoo.com/ the lubricant liquid does not leak and the high-pressure liquid is prevented from flowing into the gas-tight space formed between the rotor and the housing so as to protect electronic elements from be rusting due to the high-pressure liquid. The lubricant liquid further protects the electronic elements from gas or high-pressure liquid.

In one embodiment, this disclosure provides a fluid whirl lighting apparatus, comprising: a housing being provided with an accommodating space therein; a coil module being disposed on an inner wall of the housing; a rotor being disposed in the accommodating space and being provided with a plurality of blades on an inner wall thereof, the rotor comprising a magnetic module on an outer wall with respect to the coil module, an outer wall of the rotor forming an air-tight space sharing the inner wall of the housing to accommodate a liquid, the rotor being driven by a fluid to drive the plurality of blades to rotate so that a relative movement between the coil module and the magnetic module is caused to generate electricity; a lighting module being disposed on the outer wall of the housing and being electrically coupled to the coil module to provide illumination in response to the electricity; and an alarm element being electrically connected to the coil module so as to issue an alarm.

In another embodiment, this disclosure further provides a fluid whirl lighting apparatus, comprising: a housing being disposed on a ceiling and being provided with an accommodating space therein, one terminal of the housing being connected to a pipeline disposed inside the ceiling so as to receive a fluid from the pipeline and the other terminal of the housing being provided with a water sprinkling element screwedly connected thereto; a coil module being disposed on an inner wall of the housing; a rotor being disposed in the accommodating space and being provided with a plurality of blades on an inner wall thereof, the rotor comprising a magnetic module on an outer wall with respect to the coil module, an outer wall of the rotor forming an air-tight space sharing the inner wall of the housing to accommodate a liquid, the rotor being driven by a fluid to drive the plurality of blades to rotate so that a relative movement between the coil module and the magnetic module is caused to generate electricity; a lighting module being disposed on the outer wall of the housing and being electrically coupled to the coil module to provide illumination in response to the electricity; and an alarm element being electrically connected to the coil module so as to issue an alarm.

BRIEF DESCRIPTION OF THE DRAWINGS

The embodiments of this disclosure will be readily understood by the accompanying drawings and detailed descriptions, wherein.

DETAILED DESCRIPTION OF THIS DISCLOSURE

This disclosure can be exemplified but not limited by various embodiments as described hereinafter.

Figure 1:
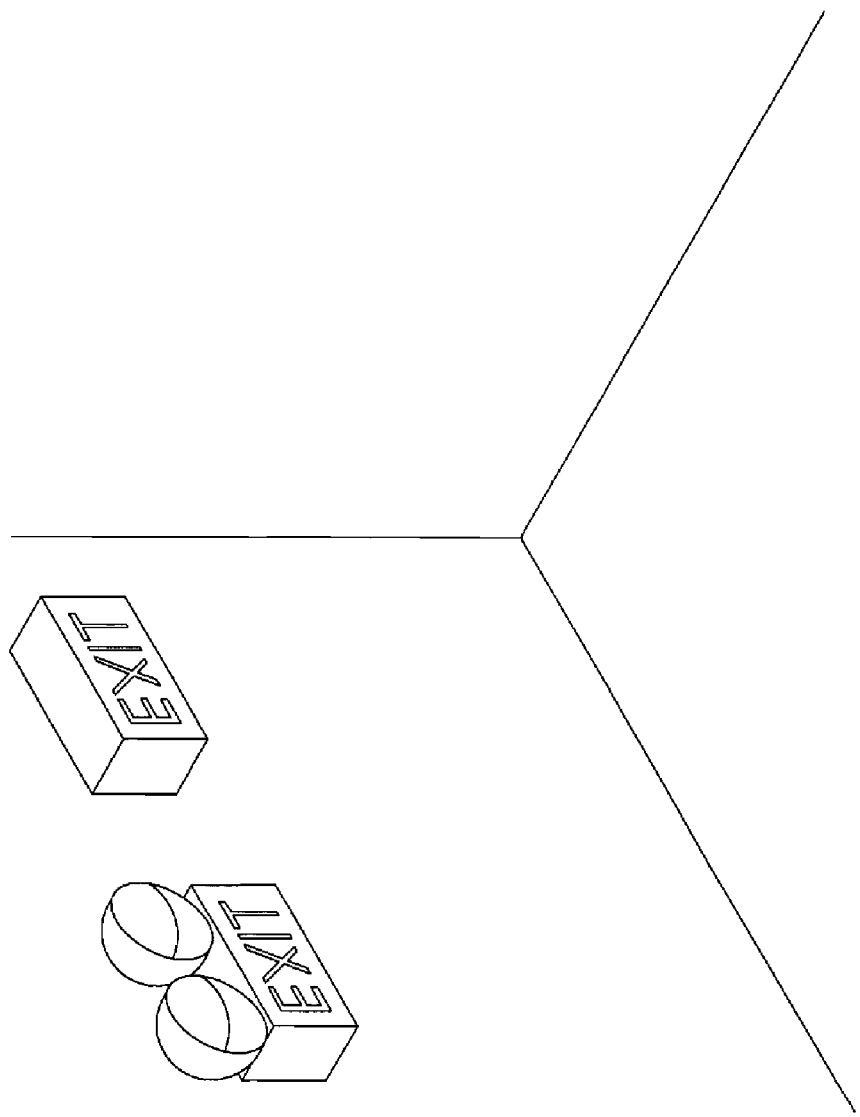
FIG. 1 is a schematic diagram of an illumination equipment and a guiding lamp.
Figure 2A:
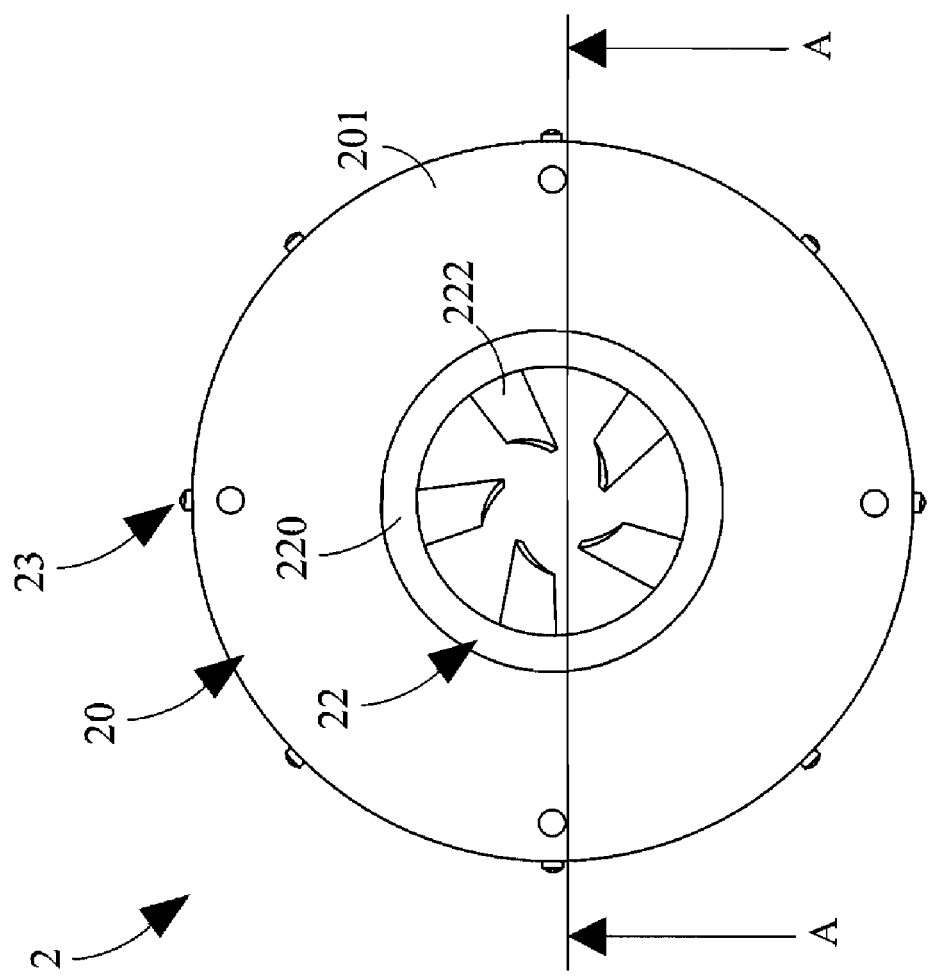
FIG. 2A is a top view of a fluid whirl lighting apparatus of this disclosure.
Figure 2B:
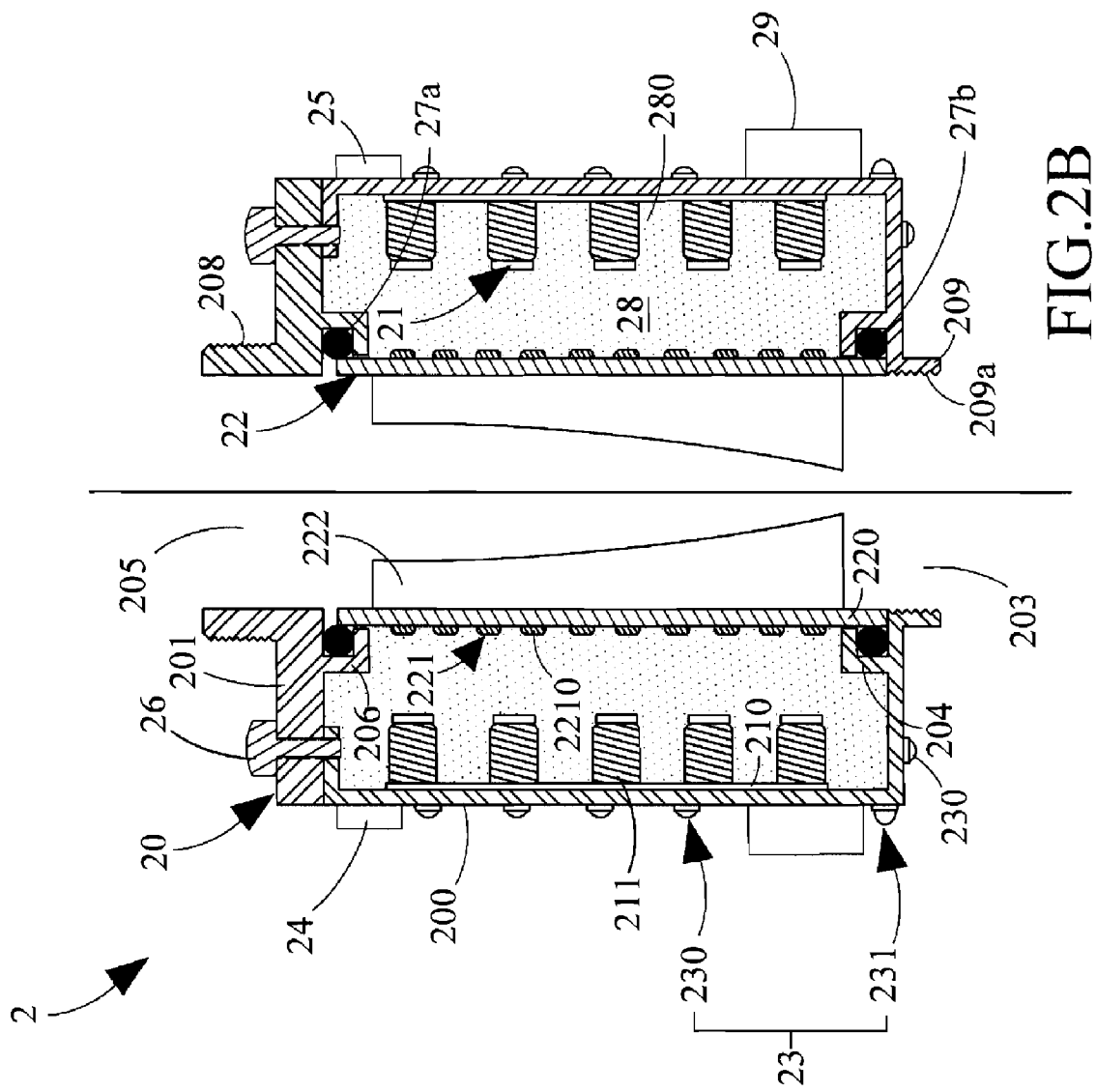
FIG. 2B is a cross-sectional view of a fluid whirl lighting apparatus of this disclosure.
Figure 2C:
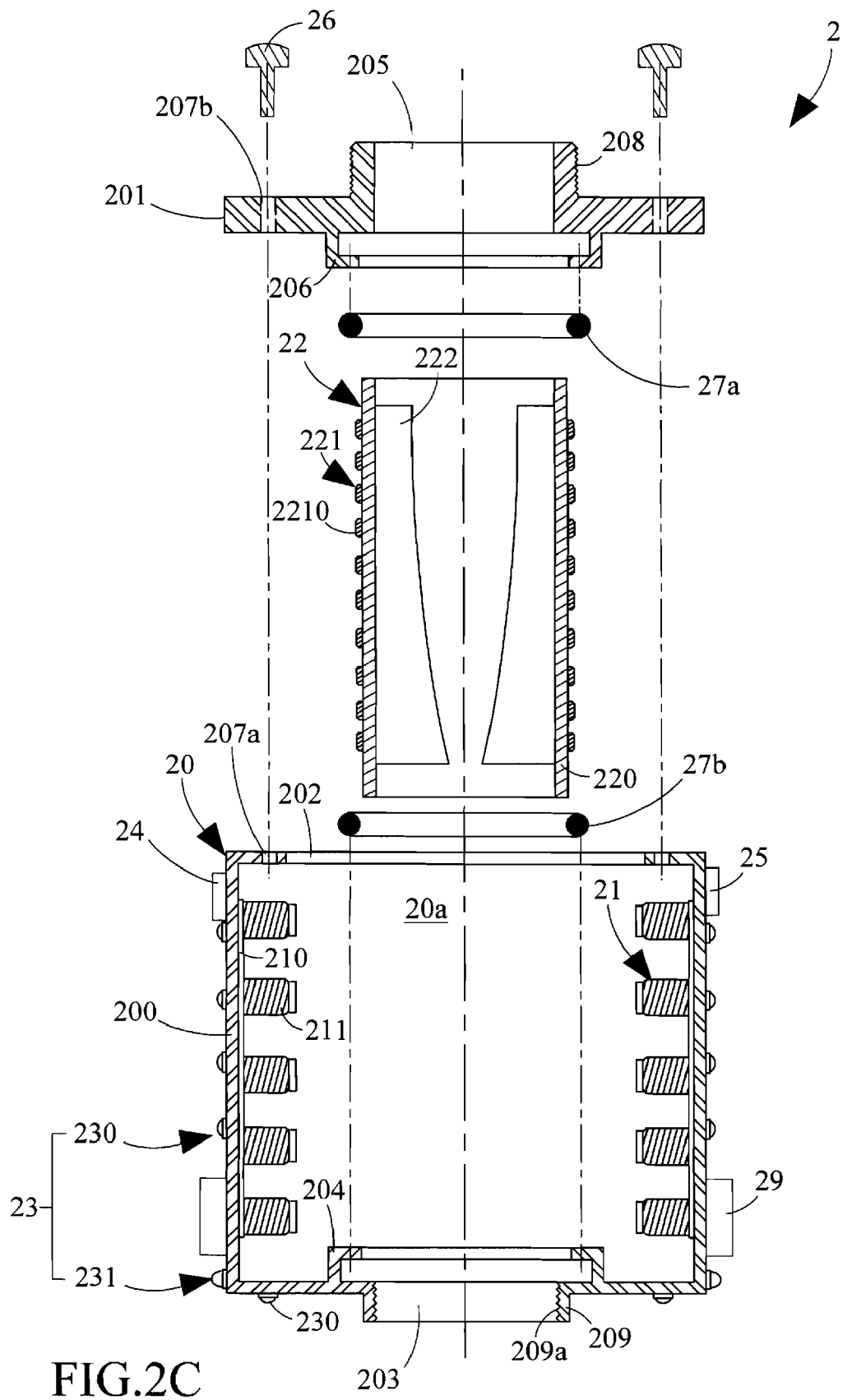
FIG. 2C is an exploded view of a fluid whirl lighting apparatus of this disclosure.

Please refer to FIG. 2A to FIG. 2C, which show a top view, a cross-sectional view along A-A and an exploded view of a fluid whirl lighting apparatus. The fluid whirl lighting apparatus 2 comprises a housing 20, which can be cylindrical or polygonal, but not limited thereof. In the present embodiment, the housing 20 is cylindrical. The housing 20 is provided with an accommodating space 20a therein. In the present embodiment, the housing 20 further a bottom structure 200 and a top cap 201. The bottom structure 200 comprises a first opening 202 and a second opening 203 on a top surface and a bottom surface respectively. A plurality of first screw holes 207a are provided around the first opening 202. The top cap 201 is fixedly disposed on the bottom structure 200 and comprises a third opening 205 corresponding to the first opening 202. On the top cap 201, a plurality of second screw holes 207b are provided corresponding to the first screw holes 207a so that a fixing element 26 fix the top cap 201 on the bottom housing 200 through the second screw holes 207b and the first screw holes 207a. The side wall of the third opening 205 is provided with a screw thread 208 so that the top cap 201 is screwedly connected to a pipeline of a hydraulic source. The pipeline is a fire fighting pipeline or other pipeline capable of supplying a liquid. The liquid is water or liquid capable of fighting fire.

Figure 2D:
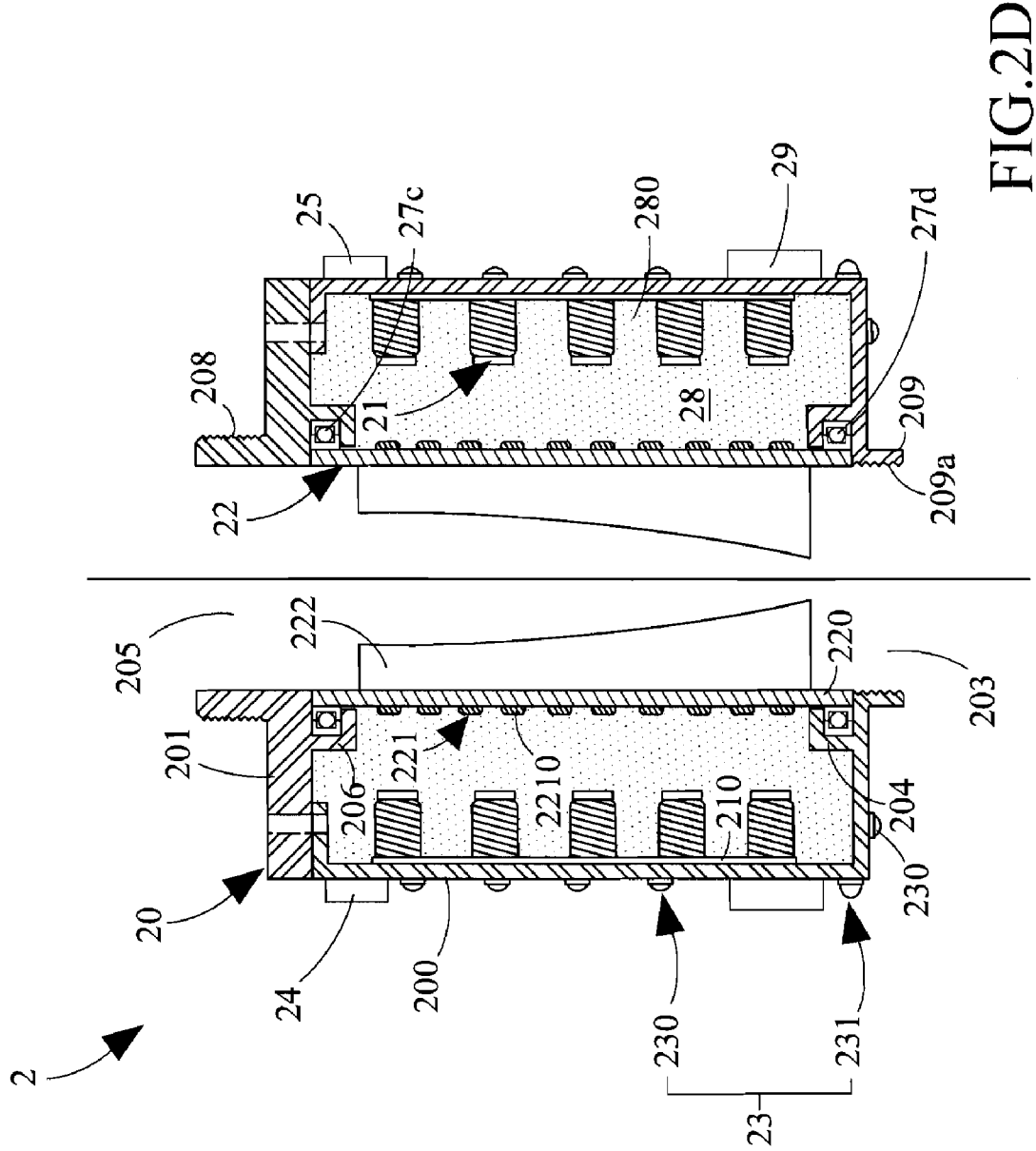
FIG. 2D is a gas-tight element according to another embodiment of this disclosure.

A coil module 21 is disposed on an inner wall of the housing 200. The coil module comprises a conductive substrate 210 and a plurality of induction coils 211 disposed on the substrate 210. The bottom structure 200 comprises an accommodating base 204 corresponding to the second opening 203. The accommodating base 204 is capable of accommodating a gas-tight element 27b. The gas-tight element 27b may be an O-ring, a washer or a ball bearing. A flange 209 is extended around the bottom structure 200 corresponding to the second opening 203. The flange 209 is provided with a screw thread 209a thereon so that the flange 209 is used as an interface for connecting to the water sprinkling element. Moreover, on the top cap 201, a fixing base 206 is provided on the side wall corresponding to the inner wall of the bottom structure 200 to as to accommodate a gas-tight element 27, such as an O-RING (o-ring), a washer (spacer) or a ball bearing. In another embodiment in as shown in FIG. 2D, the accommodating base 204 and 206 comprise supporting shafts 27c and 27d air-tightly matched with the rotor. The aperture of the screw thread 209a corresponding to second opening 203 at the bottom of the housing 20 and the aperture of the screw thread 208 corresponding to second opening 205 at the top cap 201 can be international metric or English metric for easy assembly.

A lighting module 23, being electrically connected to the coil module 21, is provided on the outer wall of the housing 20. The lighting module 23 is a light-emitting diode 230, a laser module 231 or a combination of the both. In the present embodiment, the lighting module 23 is an illumination apparatus comprising an LED 230 and a laser module 231. In this disclosure, high-pressure fire fighting water is used to generate electricity. The light-emitting diode 230 provides illumination to assist evacuation. Furthermore, a highly directional laser module 231 is added. When fire accidents take place, not all the water sprinkling device are turned on. Generally, only the high-temperature water sprinkling devices are turned on to sprinkle water. In most fire accidents, smoke congests the space. To compensate the drawbacks of conventional light source that exhibits poor transmission characteristics through the smoke, the present embodiment uses a laser module to provide a laser beam directing the exit.

Figure 3:
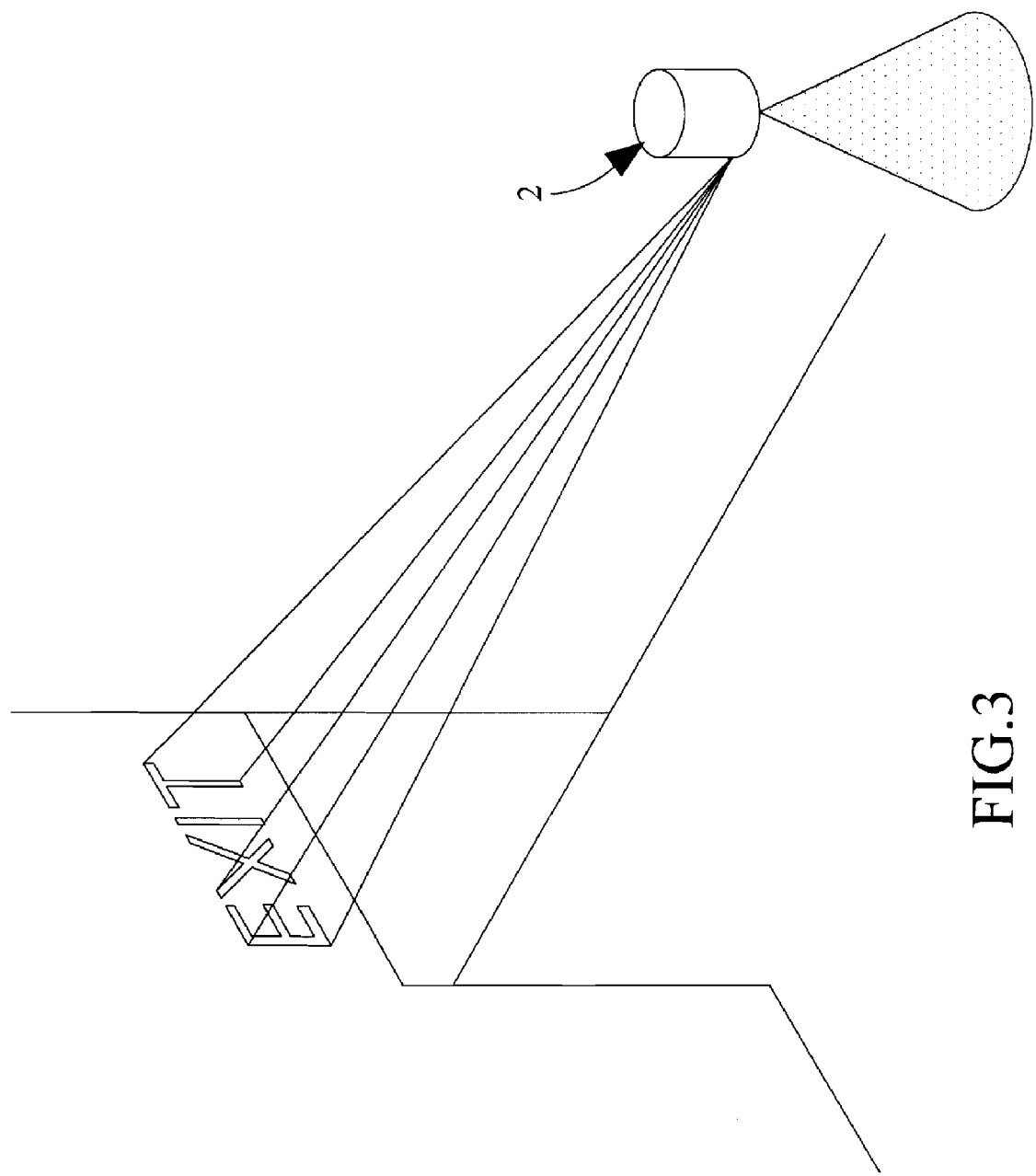
FIG. 3 is a schematic diagram showing a laser module projecting texts of this disclosure.

Therefore, when fire accidents take place indoors, a laser beam points to the exit as shown in FIG. 3 if only one fluid whirl lighting apparatus 2 is turned on. The laser beam and the text mask are used to generate texts or patterns so that the user can escape from the fire accidents according to the message brought by the laser beam. Moreover, the laser light can also be integrated with the lenses so as to focus the laser beam in a specific direction as a life guard. Moreover, if there are multiple fluid whirl lighting apparatuses 2 being turned on, in addition to multiple laser beams, illumination generated by an array of light-emitting diodes 230 can light up the scene of fire even though the electricity is off. Accordingly, different light source can be complementary so as to improve the performance of the fluid whirl lighting apparatus of this disclosure.

Returning to FIG. 2A to FIG. 2C, an alarm element 29 is further provided on the fluid whirl lighting apparatus 2. The alarm element 29 is electrically connected to the coil module 21. The alarm element 29 may be any sound making element, such as a speaker, or a combination of sound making elements. Accordingly, when an accident takes place, the alarm element 29 is able to generate an alarm sound in response to the electricity generated by the coil module 21. Moreover, an electronic element 24 is further provided between the lighting module and the coil module. The electronic element 24 is electrically connected to the coil module so as to perform current or voltage rectification on the electricity generated by the coil module 21. The electronic element 24 is further coupled to an electricity storage element 25 to store the electricity generated by the coil module 21.

Figure 4B:
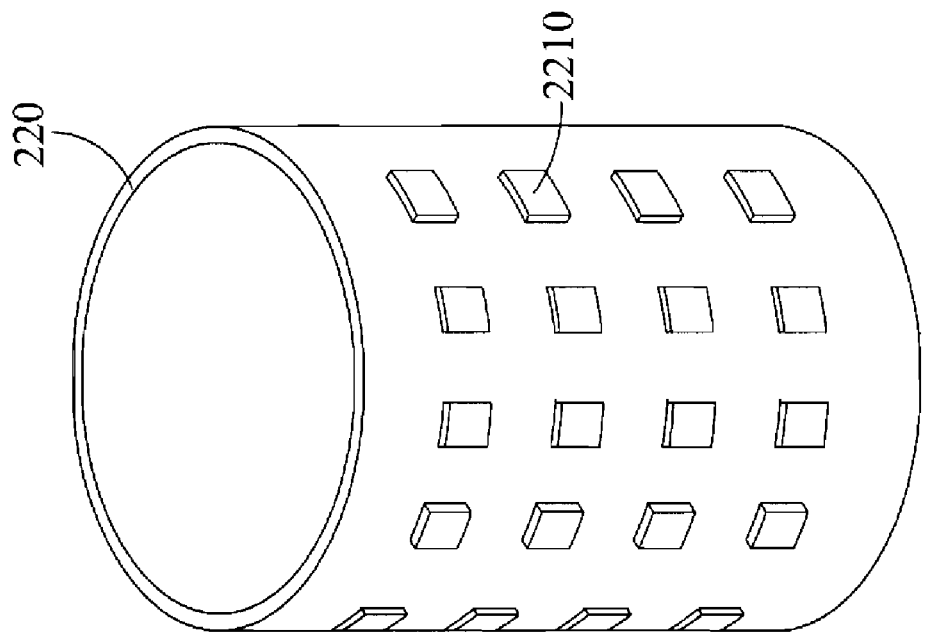
FIG. 4A and FIG. 4B are schematic diagrams showing a magnetic element of a magnetic module of this disclosure.
Figure 4A:
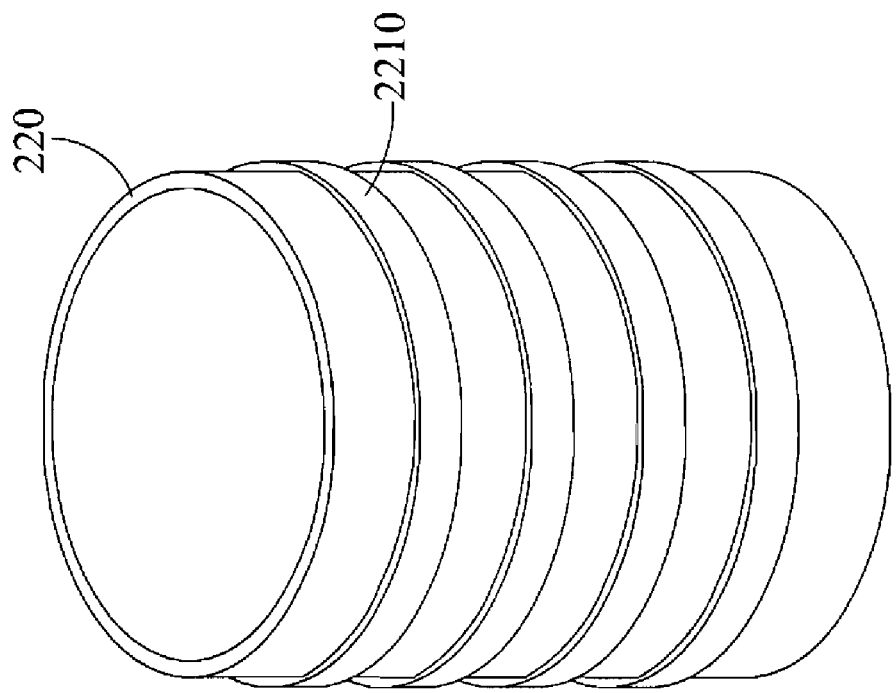

In the accommodating space 20a in the housing 20, there is provided a rotor 22. In the present embodiment, the body 220 of the rotor 22 is a hollowed cylinder. The rotor 22 is provided with a plurality of blades 222 on an inner wall thereof. A space 28 is formed between the outer wall of the rotor 22 and the inner wall of the housing 20 to accommodate a liquid 280. In the present embodiment, the liquid 280 is lubricant oil. The outer wall of the rotor 22 and the gas-tight elements 27a and 27b on the fixing base 206 on the top cap 201 and the fixing base 204 on the bottom structure 200 work together to keep the space 28 gas-tight to prevent liquid leakage. Moreover, the rotor 22 comprises a magnetic module 221 on an outer wall with respect to the coil module 21. The magnetic module 221 comprises a plurality of magnetic elements 2210. The plurality of magnetic elements 2210 can be arranged as a ring on the surface of the rotor 22, as shown in FIG. 4A. Moreover, the magnetic elements 2210 can also be arranged as an array on the surface of the rotor 22, as shown in FIG. 4B.

Figure 5A:
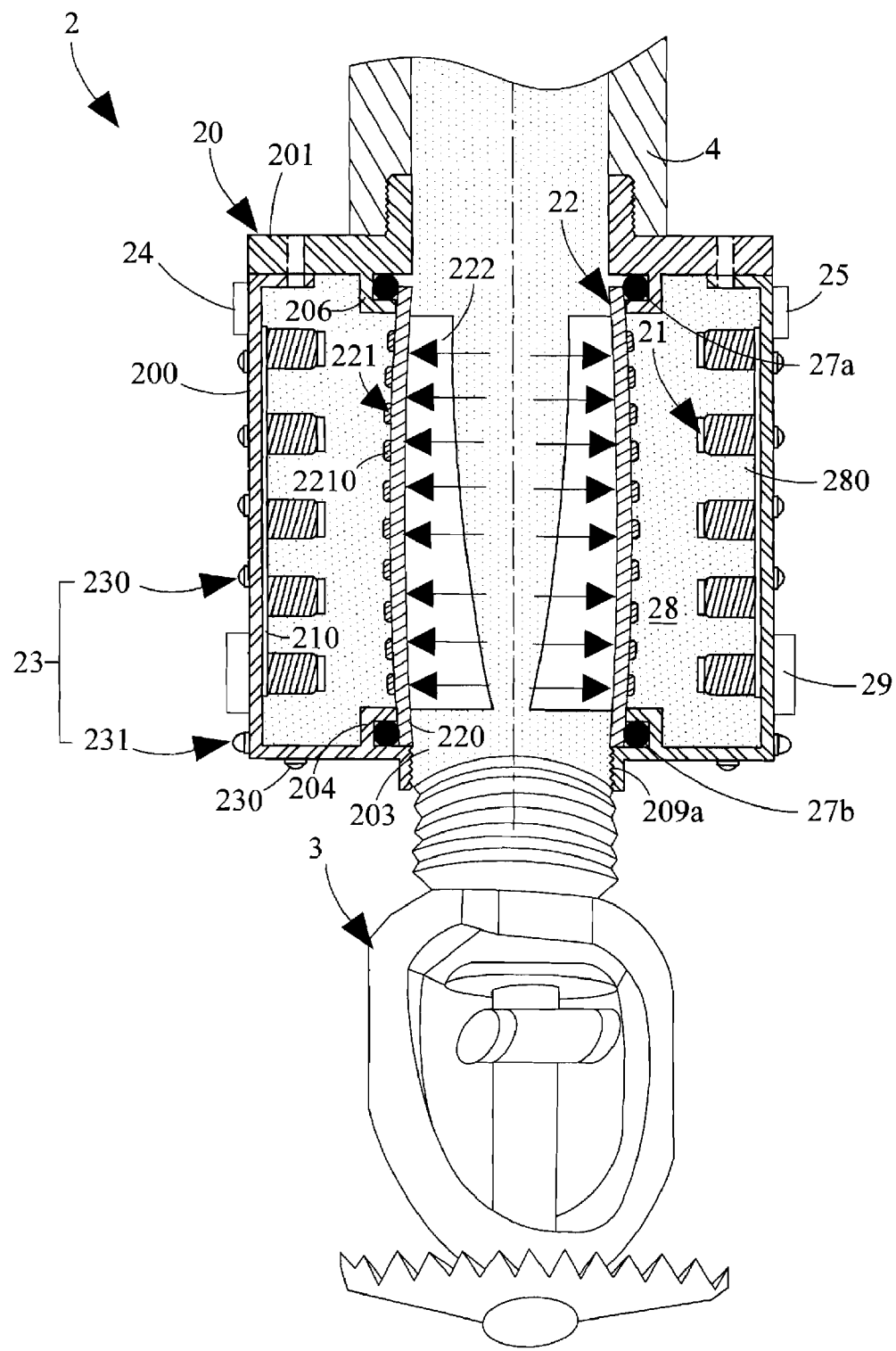
FIG. 5A and FIG. 5B are schematic diagrams showing on/off operations of a fluid whirl lighting apparatus of this disclosure.
Figure 5B:
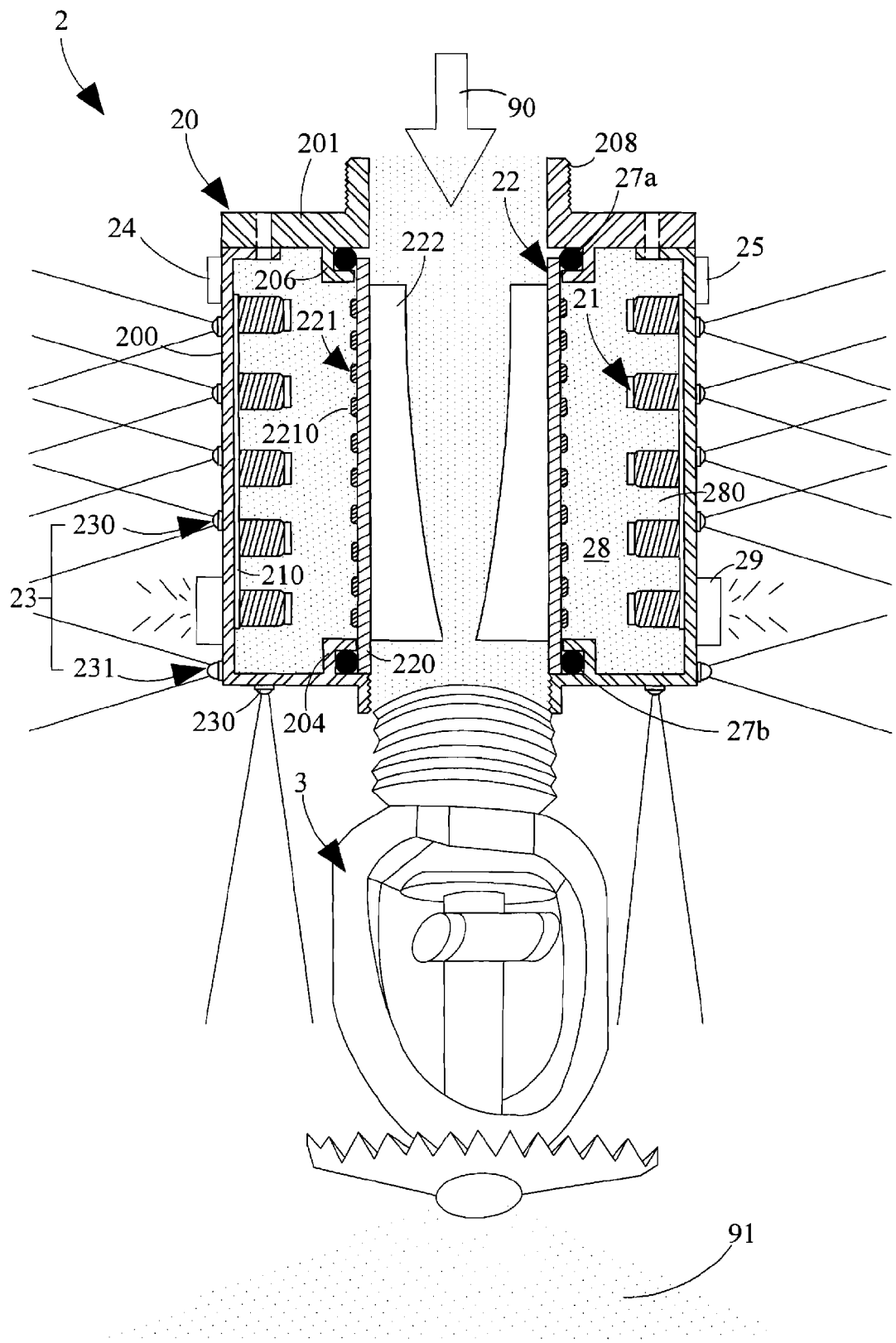

Please refer to FIG. 5A and FIG. 5B, which are schematic diagrams showing on/off operations of a fluid whirl lighting apparatus of this disclosure. In FIG. 5A, the fluid whirl lighting apparatus 2 is disposed on the ceiling so as to be coupled to the fire fighting pipeline 4 inside the ceiling. One terminal of the fluid whirl lighting apparatus 2 is provided with a water sprinkling element 3 screwedly connected to the screw thread 209a on the third opening 203.

According to Bernoulli's Law, during water sprinkling, the total pressure remains the same after the fluid passes through the fluid whirl lighting apparatus 3. The total pressure before water sprinkling is the sum of the static pressure on the inner wall of the rotor 22 and the dynamic pressure passing through the rotor 22. In FIG. 5A, the fluid whirl lighting apparatus 2 has not been activated by the high temperature, which leads to no water flow and thus the dynamic pressure inside the rotor 22 is 0. Since the total pressure is dominated by the static pressure, the hollowed rotor 22 is pressed outward by the static pressure applied on the side wall of the rotor 22. As the gas-tight elements 27a and 27b (such as an O-ring, a washer or a ball bearing) is pressed, the lubricant oil is prevented from leakage so that the water inside the hollowed rotor 22 is isolated from the oil. Accordingly, the elements (such as the coil module, etc) are soaked in the oil to prevent rusting.

In FIG. 5B, when fluid whirl lighting apparatus 2 is activated, a hydraulic source (not shown) provides a large amount of water 90 flowing into the fluid whirl lighting apparatus 2 through the fire fighting pipeline. Since the liquid passing through the rotor 22 is dynamic, the total pressure inside the rotor 22 is dominated by the dynamic pressure. The static pressure in the hollowed rotor 22 is reduced. The force applied on the blades 222 by the water flow 90 can be designed so that the blades 222 are able to drive the hollowed rotor 22 to rotate to cause a relative movement between the coil module 21 on the inner wall of the housing 20 and the magnetic module 221 on the outer wall of the rotor 22 to generate electricity. During the rotation of the rotor 22, a centrifugal force is generated and lubricant pressure is accumulated so that the rotor 22 is dynamically stable with the support from the gas-tight elements without any rigid shaft. The shear of magnetic field lines around the magnetic module 221 on the rotor 22 and the coil module 21 causes the generation of electricity to supply the lighting module 23 and the alarm element 29 to provide illumination and an alarm sound. After passing through the rotor 22, the water flows through the water sprinkling element 3 to provide a water canvas 91 for fire fighting.

Although this disclosure has been disclosed and illustrated with reference accelerometer to particular embodiments, the principles involved are susceptible for use in numerous other embodiments that will be apparent to persons skilled in the art. This disclosure is, therefore, to be limited only as indicated by the scope of the appended claims.

What is claimed is:

1. A fluid whirl lighting apparatus, comprising:
   a housing being provided with an accommodating space therein, wherein the housing further comprises:
     a bottom structure comprising a first opening and a second opening on a top surface and a bottom surface respectively, and a bottom accommodating base corresponding to the second opening to accommodate a bottom gas-tight element; and
     a top cap being fixedly disposed on the bottom structure, the top cap comprising a third opening corresponding to the first opening, and a top accommodating base corresponding to the third opening to accommodate a top gas-tight element;
   a coil module being disposed on an inner wall of the housing;
   a hollowed rotor being disposed in the accommodating space and being provided with a plurality of blades on an inner wall defining a hollow space of the hollowed rotor, the rotor comprising a magnetic module on an outer wall with respect to the coil module, the outer wall of the rotor forming an air-tight space sharing the inner wall of the housing and the top and bottom gas-tight elements to accommodate a liquid, the rotor being driven by a fluid flowing through the hollow space to drive the plurality of blades to rotate so that a relative movement between the coil module and the magnetic module is caused to generate electricity;
   a lighting module being disposed on an outer wall of the housing and being electrically coupled to the coil module to provide illumination in response to the electricity; and
   an alarm element being electrically connected to the coil module so as to issue an alarm.

2. The fluid whirl lighting apparatus as recited in claim 1, wherein each of the top and bottom gas-tight elements comprises a bearing element.

3. The fluid whirl lighting apparatus as recited in claim 1, wherein the lighting module is a light-emitting diode module.

4. The fluid whirl lighting apparatus as recited in claim 1, wherein the lighting module is a laser module.

5. The fluid whirl lighting apparatus as recited in claim 4, wherein the laser module is capable of generating texts or patterns.

6. The fluid whirl lighting apparatus as recited in claim 1, further comprising an electrical element electrically connected to the coil module and the lighting module, the electrical element being capable of recifying the current or the voltage of the electricity.

7. The fluid whirl lighting apparatus as recited in claim 6, wherein the electrical element is further coupled to an electricity storage element.

8. The fluid whirl lighting apparatus as recited in claim 1, wherein the liquid is oil.

9. The fluid whirl lighting apparatus as recited in claim 1, wherein the fluid is water.

10. A fluid whirl lighting apparatus, comprising:
    a housing being disposed on a ceiling and being provided with an accommodating space therein, one terminal of the housing being connected to a pipeline disposed inside the ceiling so as to receive a fluid from the pipeline and the other terminal of the housing being provided with a water sprinkling element screwedly connected thereto, wherein the housing further comprises:
      a bottom structure comprising a first opening and a second opening on a top surface and a bottom surface respectively, and a bottom accommodating base corresponding to the second opening to accommodate a bottom gas-tight element; and
      a top cap being fixedly disposed on the bottom structure, the top cap comprising a third opening corresponding to the first opening, and a top accommodating base corresponding to the third opening to accommodate a top gas-tight element;
    a coil module being disposed on an inner wall of the housing;
    a hollowed rotor being disposed in the accommodating space and being provided with a plurality of blades on an inner wall defining a hollow space of the hollowed rotor, the rotor comprising a magnetic module on an outer wall with respect to the coil module, the outer wall of the rotor forming an air-tight space sharing the inner wall of the housing and the top and bottom gas-tight elements to accommodate a liquid, the rotor being driven by a fluid flowing through the hollow space to drive the plurality of blades to rotate so that a relative movement between the coil module and the magnetic module is caused to generate electricity;

a lighting module being disposed on an outer wall of the housing and being electrically coupled to the coil module to provide illumination in response to the electricity; and an alarm element being electrically connected to the coil module so as to issue an alarm.

11. The fluid whirl lighting apparatus as recited in claim 10, wherein:

a side wall of the second opening is provided with a screw thread so as to be screwedly connected to the water sprinkling element; and a side wall of the third opening is provided with a screw thread so as to be screwedly connected to the pipeline.

12. The fluid whirl lighting apparatus as recited in claim 10, wherein each of the top and bottom gas-tight elements comprises a bearing element.

13. The fluid whirl lighting apparatus as recited in claim 10, wherein the lighting module is a light-emitting diode module.

14. The fluid whirl lighting apparatus as recited in claim 10, wherein the lighting module is a laser module.

15. The fluid whirl lighting apparatus as recited in claim 14, wherein the laser module is capable of generating texts or patterns.

16. The fluid whirl lighting apparatus as recited in claim 10, further comprising an electrical element electrically connected to the coil module and the lighting module, the electrical element being capable of recifying the current or the voltage of the electricity.

17. The fluid whirl lighting apparatus as recited in claim 16, wherein the electrical element is further coupled to an electricity storage element.

18. The fluid whirl lighting apparatus as recited in claim 10, wherein the liquid is oil.

19. The fluid whirl lighting apparatus as recited in claim 10, wherein the fluid is water.

20. The fluid whirl lighting apparatus as recited in claim 10, wherein the pipeline is a fire fighting pipeline.

* * * * *